Sept. 19, 1939.  W. E. HORROCKS  2,173,508
SEPARATING RACE RING THRUST BEARING
Filed July 9, 1938  3 Sheets-Sheet 1
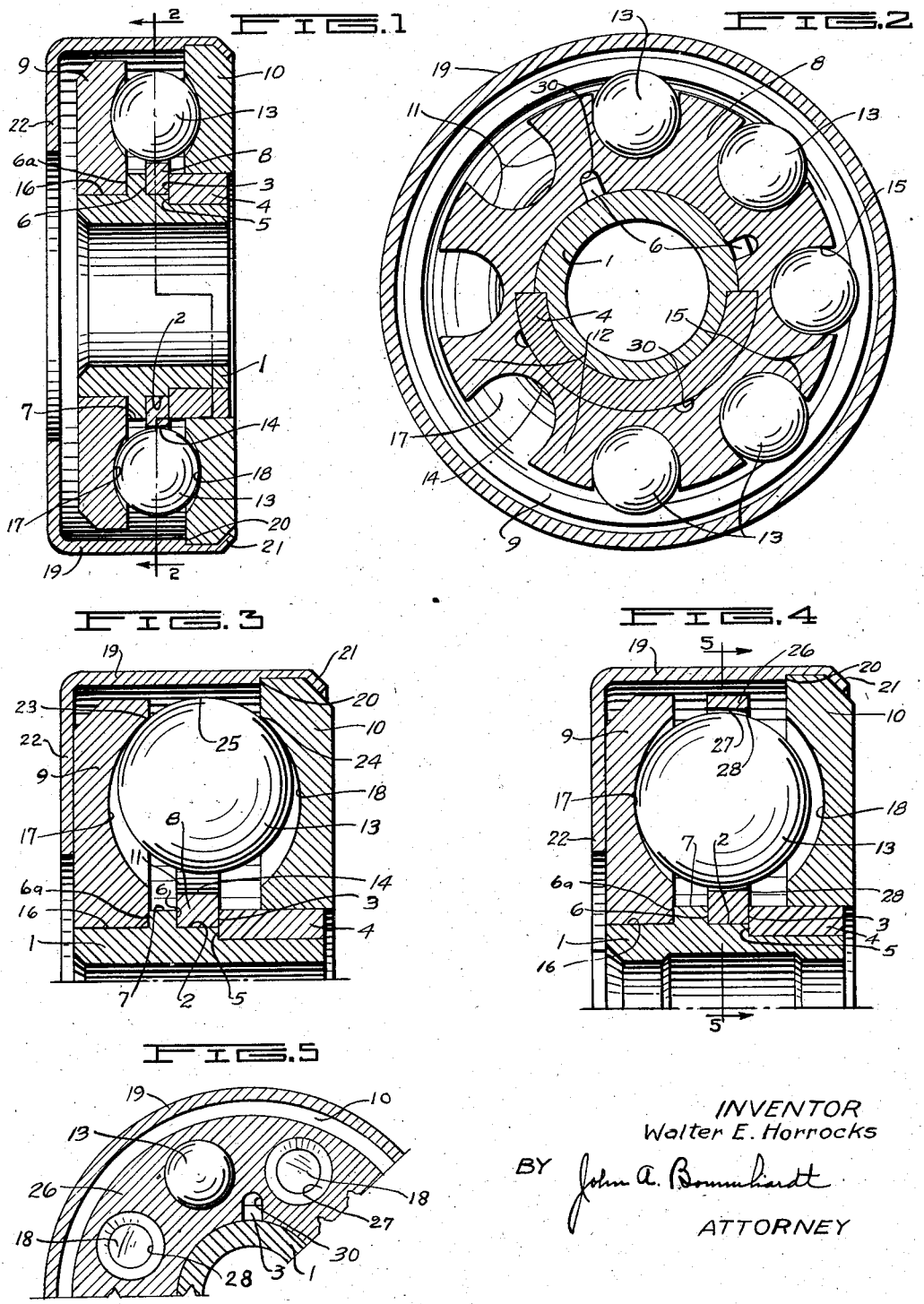
INVENTOR
Walter E. Horrocks
BY John A. Bornhardt
ATTORNEY Sept. 19, 1939.  W. E. HORROCKS  2,173,508
SEPARATING RACE RING THRUST BEARING
Filed July 9, 1938  3 Sheets-Sheet 2
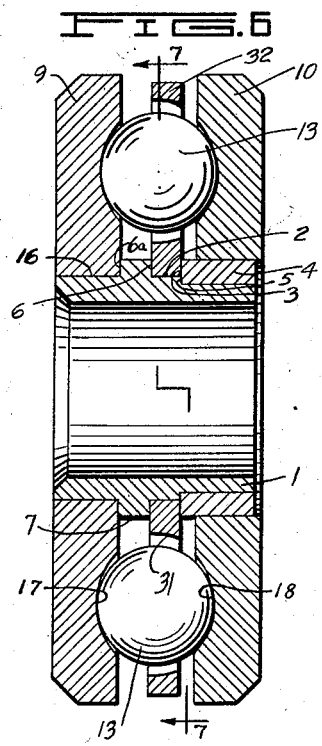
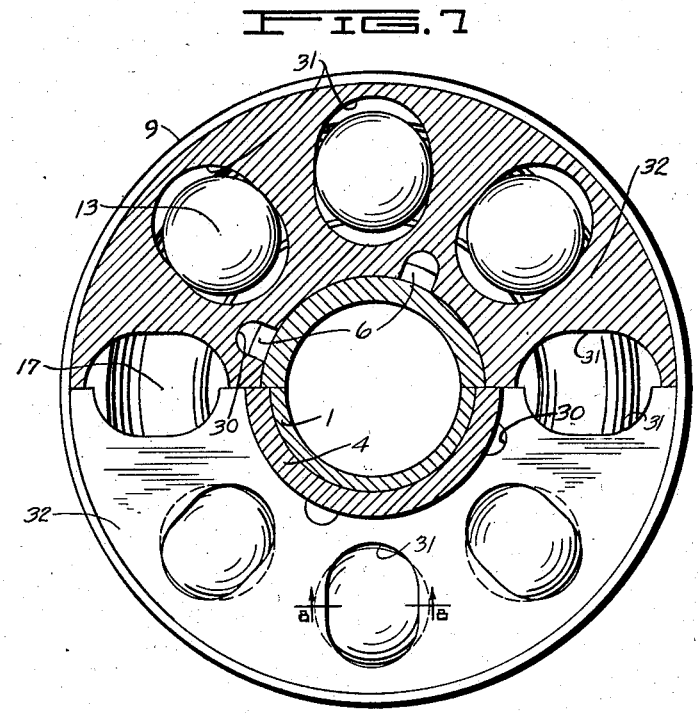
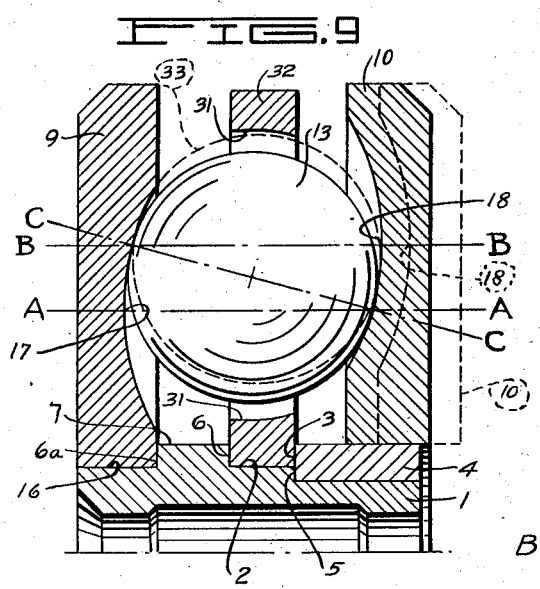
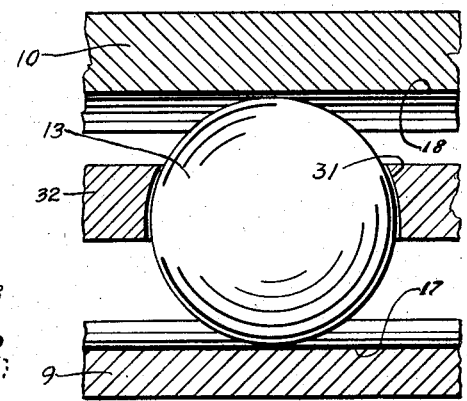
INVENTOR
Walter E. Horrocks
BY John A. Bommhardt
ATTORNEY Sept. 19, 1939. W. E. HORROCKS 2,173,508
SEPARATING RACE RING THRUST BEARING
Filed July 9, 1938 3 Sheets-Sheet 3
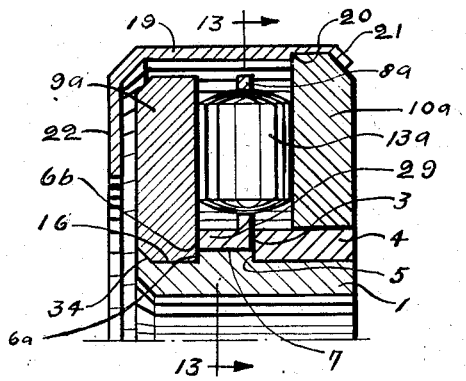
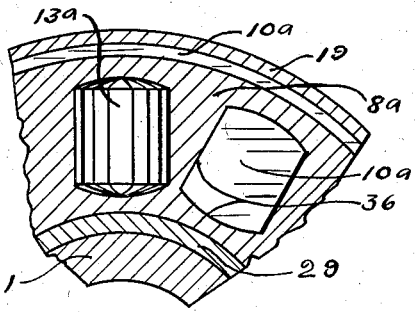
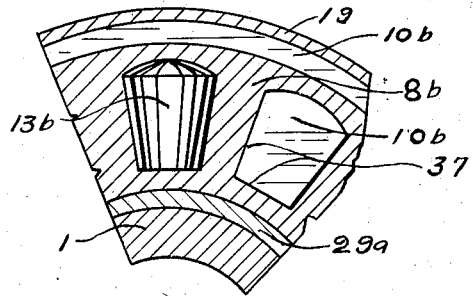
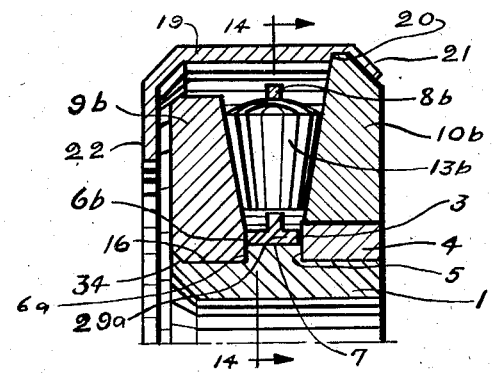
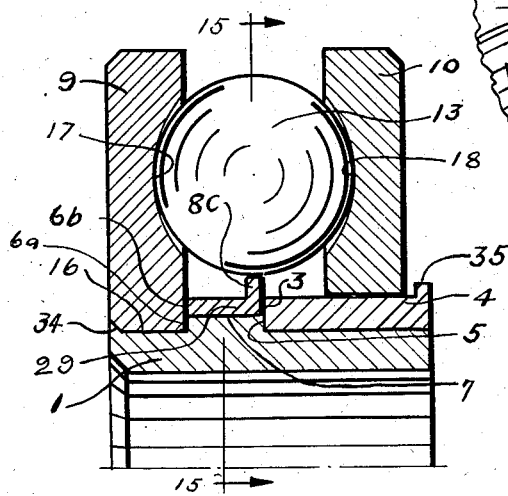
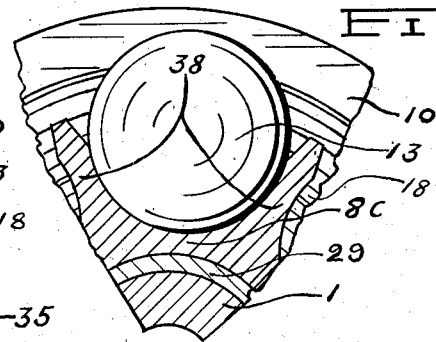
INVENTOR
Walter E. Horrocks
BY
ATTORNEY Patented Sept. 19, 1939

2,173,508

UNITED STATES PATENT OFFICE 2,173,508

SEPARATING RACE RING THRUST BEARING

Walter E. Horrocks, Lakewood, Ohio

Application July 9, 1938, Serial No. 218,286

14 Claims. (Cl. 308—235)

My invention relates to an improved unitary separating ring thrust bearing of the anti-friction type in which the separating and rolling load carrying elements are positioned between the opposing race rings in which the opposing race rings are allowed to separate when the bearing is running free, and has for its primary object to provide means for journaling the separating elements against axial or shuttle movement between the separated opposing race rings.

Bearings in which the retaining cage embraces ball load carrying elements allow of axial movement combined with eccentric displacement of the entire assembled ball retaining unit between the separated opposing race rings which results in premature wear and damage to the opposing race rings.

Bearings in which ball load carrying elements are assembled in a retainer that is journaled to a shaft in which the retainer restrains the balls from inward and outward radial movement, such as the patents to H. Hess No. 1,116,887 issued Nov. 10, 1914, L. H. Stein No. 1,958,725 issued May 15, 1934, and F. Pizzini No. 1,910,857 issued May 23, 1933, allow of a shuttle action and axial movement of the retainer and the balls between the separated opposing race rings. This shuttling action of the retainer between the separated opposing races, and the shuttling action of the balls shuttling through straight drilled annular spacing holes in the retainer between the separated opposing races is allowed by the increased space between the faces of the opposing race rings as when they are separated and are not compressed tightly against the ball bearings. This shuttling action of the retainer and the balls is present during the life of bearings such as those which are used as automobile clutch release bearings and the like. This is due to the fact that the bearing is only functioning under a load when the clutch is released and a load is imposed on the bearing which results in the compressing of the separated opposing race rings closer together tightly against the rolling elements which thereby temporarily eliminates the shuttle action of the retainer and the rolling elements between the race rings.

One of the objects of my invention relates to an improvement in bearings of this nature having for its object improved means for the maintaining of a fixed axial alinement of separators having projections and retainers or cages, for the spacing of rolling load carrying elements between separating race rings.

Another object is to provide a unitary thrust bearing in which the axially spaced retainer prevents any shuttle movement, but allows of a variable radial or fluctuating movement of the rolling load carrying elements between the separating and closing opposing race rings.

Another object is to provide a unitary separating ring thrust bearing in which a comparatively thin axially fixed rotatory spacing element or separator allows of a variable radial or fluctuating movement of the rolling load carrying elements for their proper seating between opposing grooved race members in which the race grooves have diametrical variations.

"Comparatively thin" means separating elements of a thickness that is less than one half of the diameter of the interposed rolling elements.

My invention is especially designed for, but not necessarily confined to, thrust bearings employing rolling load carrying elements operating between opposing race rings which are used in a horizontal position such as automobile clutch throw-out bearings and the like, and bearings in which the opposing races have abnormal separating characteristics which can be used in a horizontal or vertical position.

In order to accomplish these specified results I make use of a collar and a journal band such as shown in my present pending patent application Serial No. 94,074 filed August 3, 1936. With the use of this collar and the journal band with the modifications as are herein described it will be apparent that the modifications as described will allow for the manufacture of a thrust bearing in which the axially spaced separating elements and the rolling load carrying elements will be restrained from shuttle action between the separated opposing race rings and will also allow of rolling load carrying elements to fluctuate radially between spacing members of a separating element and seat between opposing race grooves having diametrical variations.

With the above and other objects in view, an embodiment of the invention is shown for using either balls or rollers for the rolling load carrying elements in the accompanying drawings in which:

Fig. 1 is a view in cross section taken through the center line of the bearing showing the bearing as when operating under a load.

Fig. 2 is a view in section approximately on line 2—2 of Fig. 1 showing a self contained thrust bearing employing a separator having projections for spacing the rolling elements.

Fig. 3 is an enlarged partial view in section showing the relative position of ball rolling elements between separated race members as when the bearing is running free without any load with the race members preventing the rolling elements from shuttle action.

Fig. 4 is an enlarged partial view in section showing the relative position of ball rolling elements between the separated race members in which a retainer is used for spacing the balls, and preventing the balls from shuttle action between the separated races when the bearing is running free without any load.

Fig. 5 is a fragmentary view in section on line 5—5 of Fig. 4 showing the retainer journaled on the collar with a ball rolling element in position and open bearing pockets and having a notch in the retainer to allow the lubricant to flow around the collar.

Fig. 6 is a view in section taken through the center line of a bearing having abnormal separating characteristics.

Fig. 7 is a view in section approximately on line 7—7 of Fig. 6 showing a thrust bearing employing a retainer for allowing of variable radial movement of ball rolling elements.

Fig. 8 is an enlarged sectional view taken on line 8—8 of Fig. 7 showing the relative relation of the ball rolling elements between separated race rings.

Fig. 9 is an enlarged partial view in section showing the relative position of ball rolling elements seated between separating race members having unaligned race grooves.

Fig. 10 is an enlarged partial view in section showing the separating element restrained from shuttle action applied to cylindrical rolling elements.

Fig. 11 is an enlarged partial view in section showing the separating element restrained from shuttle movement applied to taper rolling elements.

Fig. 12 is an enlarged partial view in section showing the separating element restrained from shuttle action applied to ball rolling elements in which the bearing is not assembled in a casing, or jacket.

Fig. 13 is a fragmentary view in section on line 13—13 of Fig. 10 showing the retainer journaled on the collar with one cylindrical rolling element in position and one open pocket.

Fig. 14 is a fragmentary view in section on line 14—14 of Fig. 11 showing the retainer journaled on the collar with one taper rolling element in position and one open pocket.

Fig. 15 is a fragmentary view in section on line 15—15 of Fig. 12 showing a separator journaled on the collar with one ball rolling element in position between the projections of the separator.

Referring to the drawings at Figs. 1 and 2 is shown a thrust bearing containing rolling elements 13 positioned between axially compressed opposing race grooves 17 and 18 in race members 9 and 10 employing a separator 8 in a fixed axial space and having rotary movement on a collar 1 which has a groove 2 constructed by means of using one side 3 of a journal band 4 which is seated against a shoulder 5 that is formed on the collar 1. The shoulder 5 on the collar 1 maintains a predetermined space between the side 3 of the journal band 4 and the side 6 of an annular rib 7 which is formed on the collar 1. The annular groove 2 which is formed between the side 6 of the rib 7 and the side 3 of the journal band 4 contains a journaled separator 8 which has a running fit on the collar 1 rotating between the side 6 of the rib 7 and the side 3 of the journal band 4 which restrains the separator 8 from any axial or shuttle movement between the opposing race rings 9 and 10.

The open roller pockets 11 that are formed between the separator projections 12 allow the rollers 13 to move outward from the bottom 14 of the roller pockets 11 between the straight sides 15 of the separator projections 12 when the bearing is rotating at a high speed and the race rings 9 and 10 separate as shown in Fig. 3.

A grooved race ring 9 is secured to one end of the collar 1 by press fitting the bore 16 of the race ring 9 over the end of the collar 1 with the grooved side of the race ring 9 seated against the side 6a of the rib 7 as shown.

An opposing grooved race ring 10 is journaled on the journal band 4 with a running fit, the journal band 4 being press fitted onto the end of the collar 1 prevents the journal band 4 from any movement on the collar 1 allowing the race ring 10 to rotate around the journal band 4 and also with a free limited axial movement.

The rolling elements 13 which track in the grooves 17 and 18 of the opposing race rings 9 and 10 are equally spaced in the grooves 17 and 18 by the projections 12 of the separating element 8 as shown in Fig. 2.

The free moving or floating race ring 10 has a shell or casing 19 secured on the outer periphery of the race 10 by shell reaming the end of the shell or casing so as to form a shoulder 20 for seating the grooved race ring 10 and then spinning the edge 21 of the casing or shell 19 over the chamfered end of the race 10 securing both together as shown. The casing can be secured to the race ring by any other convenient method as known to the art in preference to the described method.

The flange 22 of the casing 19 having a predetermined space allowed between the inner side of the flange 22 and the outer side of the race ring 9 allows of a limited axial movement of the race ring 10 on the journal band 4.

The entire void space within the bearing is filled with a suitable lubricant for the proper functioning of the coacting elements within the bearing with means provided for the lubricant reaching the annular groove 2 through the notches 30 in the separator 8 said notches being located around the bore of the separator 8 as shown in Fig. 2 or the retainer 26 as shown in Fig. 5.

Fig. 3 illustrates the bearing showing the opposing race rings separated in which the rolling elements 13 are allowed to move axially and radially to the outer periphery 23 and 24 of the grooves 17 and 18 in the opposing race rings 9 and 10. The bearing revolving at a high speed results in a centrifugal action which forces the rolling elements 13 radially outward between the grooves 17 and 18 of the opposing race rings 9 and 10. The separating of the race rings 9 and 10 is allowed by the free axial movement of the race ring 10 on the journal band 4 which is limited in its overall axial movement by the flange 22 of the casing 19 contacting the fixed race ring 9. This limited separation of the race rings prevents the rolling elements 13 from passing beyond the outer periphery 23 and 24 of the grooves 17 and 18 in the opposing race rings 9 and 10.

The rolling elements 13 being forced radially outward between the grooves 17 and 18 by the centrifugal action of the bearing revolving at a high speed contacts the outer peripheries 23 and 24 of the race grooves 17 and 18, which prevents any shuttle action of the rolling elements 13 between the opposing race rings 9 and 10, when the bearing is running free without any load.

When pressure is applied axially against the race ring 10 the rolling elements 13 are caused to resume position in the bottom of the grooves 17 and 18 as shown in Fig. 1 and Fig. 6 or at the point of tangency in grooves with diametrical variations as shown in Fig. 9 as when the bearing is working under a load.

The radius of the grooves 17 and 18 is the race rings 9 and 10 being formed to a radius larger than one half the diameter of the rolling elements 13 allows the rolling elements 13 to easily function in a variable axial and radial movement between the separating race rings 9 and 10.

Figs. 4 and 5 illustrate the invention employing a retainer between the separated opposing race rings in which the retainer 26 prevents any shuttle action of the rolling elements 13 between the separated race rings 9 and 10. The retainer 26 has equally spaced counterbored transverse holes 27 for spacing of the rolling elements 13 equally around the grooves 17 and 18 to prevent the rolling elements 13 from passing through the retainer 26 by means of the counterbored holes 27 being of a smaller diameter on one side of the retainer 26 than the diameter of the rolling elements 13 which are placed into the counterbored holes 27.

The rolling elements 13 being positioned between the race groove 17 and the counterbored holes 27 of the axially spaced retainer 26 are prevented from any shuttle action between the separated race rings 9 and 10 when the bearing is running free without any load due to the retainer 26 being axially spaced from the race ring 9 so that the small end 28 of the counterbored holes 27 retains the rolling elements against the bottom of the groove 17 of the race ring 9 and maintains a running fit of the rolling elements 13 between the race ring 9 and the retainer 26 as shown in Fig. 4 and Fig. 8.

Figs. 6 and 7 illustrate the invention employing a retainer between separating grooved race rings in which the jacket has been omitted to illustrate the abnormal separating characteristics of race members in which the countersunk elongated annular spaced transverse holes 31 in the axially spaced retainer 32 restrains any shuttle action of the rolling elements 13 between the race rings 9 and 10 when the race rings 9 and 10 are separated and also allows the rolling elements 13 to seat at natural point of contact between the grooves of the race rings 9 and 10 when the races 9 and 10 are compressed against the rolling elements 13.

The fixed race ring 9 is securely press fitted on to the collar 1 and seated against the side 6a of the annular rib 7 which is formed on the collar 1, the rotary movable retainer 32 containing a row of annular spaced countersunk elongated transverse holes 31 is journaled on the collar 1 in an annular groove 2 which is formed on the collar by means of using the side 6 of the annular rib 7 and the side 3 of a journal band 4 which is pressed fitted onto the collar 1 with the one side of the journal band 4 seated against the annular shoulder 5 which is formed on the collar 1 holding the retainer 32 in a fixed axial alinement in relation to the fixed race ring 9 regardless of any separating action of the free moving race ring 10. The notches 30 shown located around the bore of the retainer 32 are for the purpose of the lubricants to pass into the annular groove 2 on the collar 1.

Fig. 8 illustrates the relative position of the rolling elements 13 between separating race rings 9 and 10 in which the rolling elements 13 work between the groove 17 of the tight race ring 9 and the countersunk transverse holes 31 of the retainer 32 in which the small end of the countersunk holes prevents any shuttle action of the rolling elements 13 between the separating race rings 9 and 10.

Fig. 9 illustrates the invention showing the rolling elements seated in the grooves of opposing race members 9 and 10 in which the grooves 17 and 18 are not in alinement with each other in which the line A—A is located through the exact center of the groove 17 in the tight race ring 9 and the line B—B is located through the exact center of the groove 18 in the opposing race ring 10 with the line C—C passing through the center of the rolling elements 13 and intersecting the grooves of the opposing race rings 9 and 10 at the point of tangency between the rolling elements 13 and the race grooves 17 and 18 which is the natural point of seating for the rolling elements 13 between the compressed grooved race members 9 and 10 as when the bearing is operating under a load and the race grooves have diametrical variations.

The circular dotted line 33 shows the relative position of the rolling elements 13 between the separated race rings 9 and 10 in which the separating race ring 10 is indicated in dotted lines as when the bearing is running free and is not under a load. When pressure is applied to the separated race ring 10 towards the fixed race ring 9 the rolling elements 13 resume their natural seating contact within the grooves of the race rings 9 and 10 as shown in Fig. 9 and Fig. 6.

This feature allows of the practical use in this type of bearing of separating opposing race rings with unmatched grooves, or in which the center lines of the grooves vary in diametrical dimensions which results in a greater amount of tolerances being adaptable for manufacturing and assembling purposes.

This feature also allows in this type of bearing for the transmission of the thrust points of contact from a predetermined circular line of travel to a larger or smaller circular line of travel.

Fig. 10 illustrates the invention adapted for use with rolling elements 13a positioned between flat faced opposing race rings 9a and 10a in which the separating element 8a has an extended flange 29 with the element 8a journaled in a groove on the collar 1 which is formed between the inner face 6b of the race 9a and the inner side 3 of the journal band 4 which is press fitted on to the collar 1 against the shoulder 5 which forms the groove on the collar 1 to restrain the separating element 8a from axial or shuttle movement while allowing of a rotary movement of the separating element 8a on the collar 1.

Fig. 11 illustrates the invention adapted for use with rolling elements 13b positioned between taper faced opposing race rings 9b and 10b in which the separating element 8b has a hub 29a which is journaled in a groove on the collar 1 which is formed between the inner side 6b of the race 9b and the inner side 3 of the journal band 4 which is press fitted on the collar 1 against the shoulder 5 which forms a groove on the collar 1 to restrain the separating element 8a from shuttle or axial movement while allowing of a rotary movement of the separating element 8a on the collar 1.

Fig. 12 illustrates the invention adapted for use with rolling elements 13 positioned between grooved opposing race rings 9 and 10 in which the separating element 8c has an extended flange 29 which is journaled in a groove on the collar 1 which is formed between the inner face 6b of the race 9 and the inner side 3 of the journal band 4 which is press fitted on to the collar 1 to restrain the separating element 8c from shuttle or axial movement while allowing of a rotary movement of the separating element 8c on the collar 1. The journal band 4 has an extending flange 35 to limit the axial movement of the race ring 10 and to maintain the bearing in assembled form as when the bearing is running free without any load.

Fig. 13 illustrates the retainer 8a which has equally spaced transverse openings 36 for spacing of the rolling elements 13a between flat opposing race rings 9a and 10a shown in Fig. 10.

Fig. 14 illustrates the retainer 8b which has equally spaced transverse openings 37 for spacing of the rolling elements 13b between tapered opposing races 9b and 10b as shown in Fig. 11.

Fig. 15 illustrates the separator 8c which has equally spaced projections 38 for spacing the rolling elements 13 between grooved face opposing race rings 9 and 10 as shown in Fig. 12.

The bores 16 of the race rings 9, 9a and 9b may be countersunk on the outer face, and the adjacent end of the collar 1 press fitted into the counterbore 34 as shown.

From the foregoing description the operation of the bearing will be apparent as the annular groove which is formed on the collar maintains a fixed axial alinement of the rotary separating elements that are journaled in the annular groove and prevents any shuttle action of these parts, which in turn also prevents any shuttle action of rolling load carrying elements between separating races that are used in combination with a separator, retainer, or cage that is positioned between separating opposing race rings and will allow of the unrestrained seating of rolling load carrying elements between opposing race grooves having diametrical variations in the opposing race grooves which are compressed against the rolling load carrying elements as when the bearing is working under a load, or as when the bearing is running free without any load with the fixed axial spacing of the separating elements being held in the correct relation to the center line of the rolling load carrying elements to allow of manufacturing the separating elements from comparatively thin stock. This results in the contacting parts of the separating elements that are in contact with the rolling load carrying elements being held to a minimized area of frictional contact, and at the same time being maintained in the correct relative position axially to the center line of the rolling elements and to the opposing faces of the race rings for the annular spacing and seating of the rolling load carrying elements without allowing of the rolling load carrying elements overrunning the axially spaced thin separating element, as when the separating element is constructed with an open edge separator having projections with straight sides, as shown in my pending application Serial No. 94,074, filed August 3, 1936, and my application for Self contained ball thrust bearings Serial No. 216,426 filed June 29, 1938, in which the rollers are restrained from shuttle action by the separated opposing race rings.

Having described my invention in the form of an annular groove extending axially between a rib and a journal band and between a race ring and a journal band to increase the width of the annular groove to accommodate different types of separating elements against axial or shuttle movement between separating race rings slight modifications can be made such as constructing the journal band and the collar in one integral piece without departing from the spirit of the scope of the invention and I reserve the right to the use of different combinations of ferrous or non-ferrous metals or alloys for constructing the separating elements, the journal band or the collar without departing from the spirit of the scope of the invention.

Having described my invention, what I claim and desire to secure by Letters Patent is:

1. A unitary separating race ring thrust bearing comprising a collar adapted to fit on a rotary element, a race ring secured to one end of the collar, a journal band secured to the opposite end of the collar, an opposing free moving race ring journaled on the said journal band, an annular rib formed on the said collar between the fixed race ring and the journal band, a non-axially movable separator journaled on the said collar between the said rib and the journal band, and rolling elements working between the opposing sides of the said race rings.

2. A unitary separating race ring thrust bearing comprising a collar adapted to fit on a rotary element, a race ring secured to one end of the collar, a journal band secured to the opposite end of the collar, an opposing free axially moving race ring journaled on the said journal band, a separator journaled on the said collar for rotary movement between the opposing sides of the said race rings, means for restraining said separator from shuttle and axial movement therebetween, and rolling elements working between the opposing sides of the said race rings.

3. A unitary separating race ring thrust bearing comprising a collar adapted to fit on a rotary element, a race ring fixed to one end of the collar, a concentric bearing ring secured to the opposite end of the collar, a free axially moving opposing race ring journaled on the said concentric ring, a spacing element journaled on the said collar between the fixed race ring and the concentric ring, and rolling elements working between the opposing sides of the said race rings.

4. A unitary separating race ring thrust bearing comprising a collar or sleeve adapted to fit on a rotary element, a race ring fixed to one end of the collar or sleeve, a concentric bearing ring secured to the opposite end of the collar or sleeve, a free moving opposing race ring journaled on the said concentric ring, a spacing element journaled on the said collar for rotary movement between the opposing sides of the said race rings, means on the collar for restraining said spacing element from shuttle and axial movement therebetween, and rolling elements working between the opposing sides of the said race rings.

5. A unitary separating race ring thrust bearing comprising a collar or sleeve adapted to fit on a rotary element, a race ring secured to one end of the collar or sleeve, a journaled band ring secured to the opposite end of the collar or sleeve, an opposing free moving race ring journaled on the said journal band ring, a comparatively thin separating element journaled on the said collar between the opposing race rings and having rotary movement, means on the collar for restraining said separating element from shuttle and axial movement therebetween, and rollers working between the opposing race rings and restrained from shuttle action therebetween.

6. A unitary separating race ring thrust bearing comprising a collar or sleeve adapted to fit on a rotary element, a race ring fixed to one end of the collar or sleeve, a flanged journal band secured to the opposite end of the said collar or sleeve, a free moving opposing race ring journaled on the said flanged journal band with free rotary and limited axial movement thereon, rollers and a separating element working between the opposing race rings and restrained from shuttle action therebetween.

7. A unitary separating race ring thrust bearing comprising a collar adapted to fit on a rotary element, a race ring fixed to one end of the collar, a concentric ring journal band secured to the opposite end of the collar, a free moving opposing race ring journaled around the concentric ring journal band, a comparatively thin separating element journaled on the said collar between the said opposing race rings, rollers working between the opposing race rings and the separating members of the separating element, said separating element having rotary movement, means on the collar to restrain said element from shuttle and axial movement, said rollers having fluctuating movement but restrained from shuttle movement between the opposing race rings.

8. A unitary separating race ring thrust bearing comprising a pair of opposing race rings mounted on an annular grooved collar, one race ring securely attached to one end of the collar, the opposing race ring being journaled around the opposite end of the said grooved collar, a comparatively thin separating element rotating in the annular groove on said collar and restrained from shuttle or axial movement thereon, rolling elements working between the spacing members of the said separating element and the opposing race rings and being restrained from shuttle action between the said opposing race rings.

9. A unitary separating ring thrust bearing comprising a pair of opposing race rings, one of said race rings rotary relative to the opposing race ring, a rotary separating element, means to restrain said element from axial and shuttle movement while working between the said opposing race rings, rolling elements with fluctuating movement working between the said opposing race rings but restrained from shuttle movement therebetween, said separating element and said opposing race rings with interposed rollers therebetween unified on an annular grooved collar and adapted for rotary movement.

10. A unitary separating race ring thrust bearing comprising a pair of opposing race rings and rolling elements between said rings, one race ring having a collar attached thereto, with the opposing race ring and a separating element journaled on the collar, and the said collar having means for restraining the separating element from axial or shuttle movement while allowing rotary and axial movement of the said opposing race ring thereon.

11. A unitary separating race ring thrust bearing comprising a pair of opposing race rings and rolling elements between said rings, one race ring having a collar attached thereto, and the opposing race ring and a comparatively thin separating element journaled on the collar with means on the collar restraining the separating element from axial or shuttle movement while allowing rotary and axial movement of the said opposing race ring thereon, with the said opposing race rings restraining shuttle action of the said rolling elements therebetween.

12. A unitary separating race ring thrust bearing comprising a collar, adapted for application to rotatory elements, a race ring fixed to one end of the collar, a concentric journal band fixed to the opposite end of the collar, a free axially moving opposing race ring journaled on the said concentric journal band, an open edge separating element journaled on the said collar between the opposing sides of the opposing race rings, rolling elements with fluctuating movement working between the opposing race rings, the opposing race rings having means restraining shuttle action of the said rolling elements therebetween.

13. A unitary separating race ring thrust bearing comprising a collar adapted to fit on a rotatable element, a race ring secured to one end of the collar, a concentric ring journal band secured to the opposite end of the collar, an opposing free axially moving race ring journaled on the said concentric ring journal band, a separating element journaled on the said collar for rotary movement between said collar and band whereby it is restrained from shuttle movement between the opposing race rings while allowing fluctuating movement of the rolling elements, that are restrained from shuttle action between the said opposing race rings.

14. A thrust bearing comprising a collar, a pair of race rings one of which is fixed and the other of which is axially movable on the collar, rollers between the races, and a separator for the rollers, rotatable on the collar, and means on the collar to prevent axial movement of the separator thereon.

WALTER E. HORROCKS.

CERTIFICATE OF CORRECTION.

Patent No. 2,173,508. September 19, 1939.

WALTER E. HORROCKS.

It is hereby certified that error appears in the printed specification of the above numbered patent requiring correction as follows: Page 4, second column, line 69, claim 5, for "journaled" read journal; and that the said Letters Patent should be read with this correction therein that the same may conform to the record of the case in the Patent Office.

Signed and sealed this 24th day of October, A. D. 1939.

(Seal)

Henry Van Arsdale,
Acting Commissioner of Patents.